INVENTORS
WALTER P. GORZEGNO
FREDERICK H. WEBER & ROBERT H. PAI

BY Richard H. Thomas ATTORNEY

INVENTORS
WALTER P. GORZEGNO, FREDERICK H. WEBER
& ROBERT H. PAI
BY
Richard H. Thomas
ATTORNEY INVENTORS
WALTER P. GORZEGNO, FREDERICK H. WEBER & ROBERT H. PAI
BY
Richard H. Thomas ATTORNEY June 13, 1967 W. P. GORZEGNO ET AL 3,324,837

MULTIPLE PASS DESIGN FOR ONCE-THROUGH STEAM GENERATORS

Filed May 27, 1964 13 Sheets-Sheet 6

INVENTORS
WALTER P. GORZEGNO, FREDERICK H. WEBER
& ROBERT H. PAI
BY
Richard H. Thomas
ATTORNEY INVENTORS
WALTER P. GORZEGNO
FREDERICK H. WEBER & ROBERT H. PAI
BY Richard H. Thomas ATTORNEY

MULTIPLE PASS DESIGN FOR ONCE-THROUGH STEAM GENERATORS

Filed May 27, 1964

INVENTORS
WALTER P. GORZEGNO
FREDERICK H. WEBER
ROBERT H. PAI
BY
Richard H. Thomas
ATTORNEY

4 PASS FURNACE

5 PASS FURNACE

INVENTORS
WALTER P. GORZEGNO
FREDERICK H. WEBER
ROBERT H. PAI

Richard H. Thomas ATTORNEY

MULTIPLE PASS DESIGN FOR ONCE-THROUGH STEAM GENERATORS

Filed May 27, 1964 13 Sheets-Sheet 13

INVENTORS
WALTER P. GORZEGNO
FREDERICK H. WEBER
ROBERT H. PAI
BY
Richard H. Thomas ATTORNEY

United States Patent Office 3,324,837

Patented June 13, 1967

3,324,837

MULTIPLE PASS DESIGN FOR ONCE-THROUGH STEAM GENERATORS

Walter P. Gorzegno, Florham Park, N.J., Frederick H. Weber, Syosset, N.Y., and Robert H. Pai, East Orange, N.J., assignors to Foster Wheeler Corporation, New York, N.Y., a corporation of New York Filed May 27, 1964, Ser. No. 370,604
16 Claims. (Cl. 122—406)

This invention relates to a forced-flow vapor generating unit of the once-thru type, and more particularly, to the construction and arrangement of the fluid heating enclosure walls for the forced-flow unit.

The "Benson" principle, concerning the use of heated riser tube circuits coupled to unheated downcomer circuits for an enclosure wall design for once-thru vapor generators, has found wide acceptance in Europe, and more recently in the United States and Japan. In Europe, this "Benson" principle is usually associated with a skin cased construction, in which the tubes or tube panels lining the combination chamber are encased by a metal casing and insulation providing a gas-tight construction.

The present invention pertains to the use of this "Benson" principle of an enclosure design, with the enclosure circuits routed in a manner to permit continuous welding of the tubes in the combustion chamber, along the lengths thereof, to form a gas-tight finned tube membrane wall which is satisfactory from stress and structural design criteria.

It is known in the construction of an all-welded membrane wall, defining a fluid heating enclosure for a forced-flow vapor generating unit, to route the boundary wall circuits in an up-down-up pattern continuously repeating itself around the periphery of the unit. However, the fluid enthalpy pick-up of a single circuit is of necessity high requiring constant operation of a gas recirculation fan to limit furnace circuit absorption. In addition, the up-down-up circuitry required in general a higher fluid velocity, than a straight upflow circuit, to achieve satisfactory circuit characteristics from a stability and sensitivity point of view.

Another prior development illustrates the construction of a partially welded boundary wall fluid heating enclosure for forced-flow vapor generating units wherein the boundary wall circuit consist of two upflow passes. The first upflow pass contains subcooled fluid and the second upflow pass contains fluid in the liquid and vapor phases. The two passes are present in alternating arrangement around the periphery of the furnace in the burner zone. However, in this development the burner zone area is skin cased and only the remainder of the furnace enclosure uses an all-welded membrane type construction. It is impossible to extend the all-welded membrane type construction into the burner zone area, since the fluid enthalpy pick-up in each pass in the burner zone is so high as to cause a temperature differential between adjacent tubes sufficient to result in rupture of the enclosure.

These and other disadvantages are overcome in accordance with the present invention by providing in a vapor generator of the once-thru type, an all-welded membrane boundary wall construction for the furnace enclosure, the enclosure comprising first and second opposite walls (for instance, opposite front and rear walls) and side walls intermediate or between the first and second walls. Burners are disposed in at least one of the first and second walls. In the lower burner zone and the portion of the furnace above the burner zone, the boundary wall comprises a circuit arrangement for the furnace enclosure which includes at least three passes in series in the burner zone of the enclosure, and at least one additional pass in the upper portion of the furnace, the burner zone passes including first and last passes and at least one intermediate pass. Intermediate mixing points between the successive flow passes are provided limiting the fluid enthalpy pick-up in each pass to a predetermined amount. All of the passes are made up of a plurality of upflow tubes, the first and second walls being formed predominantly of tubes of the first and last passes and the side walls being formed predominantly of tubes of the intermediate pass, forming an area of transition between the expansion and contraction of the first pass tubes relative those of the last pass. External downcomers between the passes are provided.

It will become apparent that by this invention, the circuits are routed in a manner to permit continuous welding of the tubes to form a gas-tight enclosure which is satisfactory from stress and structural design criteria. As a further advantage, the arrangement of the enclosure circuits is such that the fluid ethalpy pick-up of a given circuit pass will be well within limits allowing a greater tolerance for uneven furnace heat absorption around the periphery of the furnace, and achieving minimal fluid flow unbalance caused by asborption heat upset. These advantages are achieved without constant operation of a gas-recirculation fan to limit heat absorption of the circuits under variable load operation.

The invention further permits the unit to be designed for higher fluid velocities in the lower portion of the furnace section exposed to high heat absorption rates, and lower fluid velocities in the upper furnace section exposed to relatively lower heat absorption with the fluid velocities varied in each pass to effect the desired cooling of the tube metal and at the same time to provide a minimum pressure drop in the unit. In this respect, the use of upflow tubes only in the furnace enclosure achieves good circuit characteristics from a stability and sensitivity point of view with a minimum fluid pressure drop.

The invention and these and other advantages will become apparent upon consideration of the following specification with reference to the drawings, in which.

Figure 1:
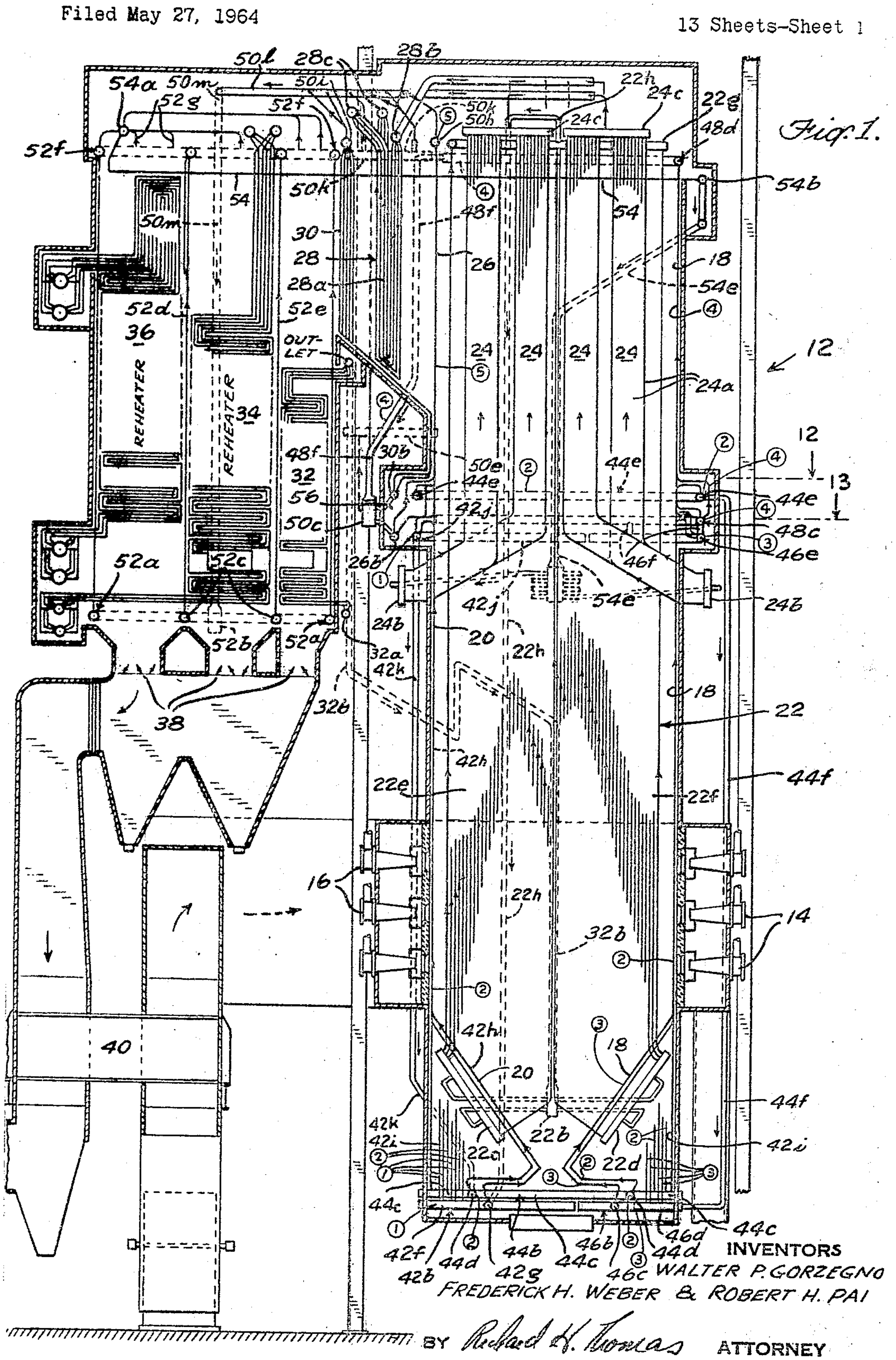
FIGURE 1 is a sectional side elevational view of a once-thru vapor generating unit embodying the invention.
Figures 7, 8:
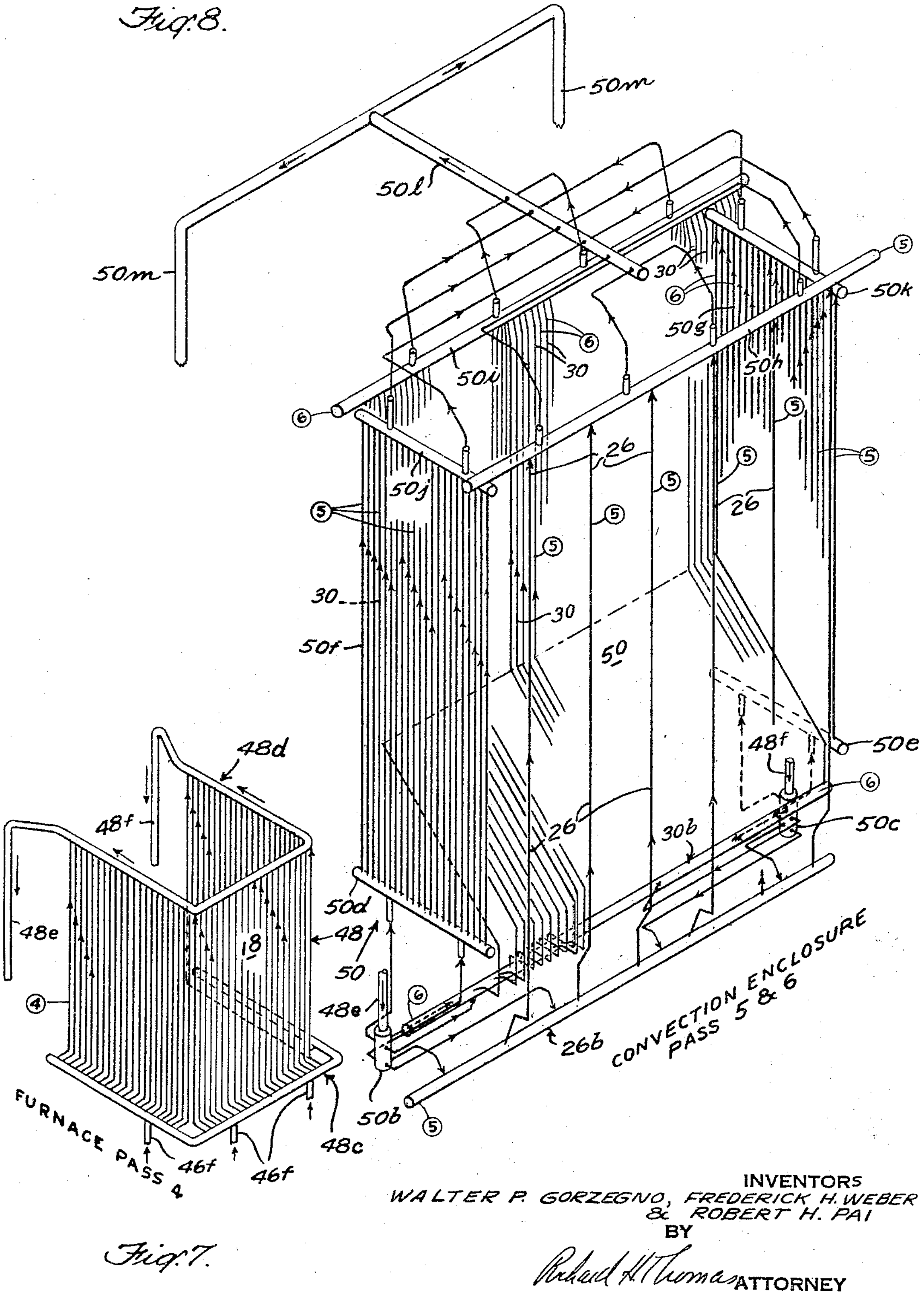
Figure 9:
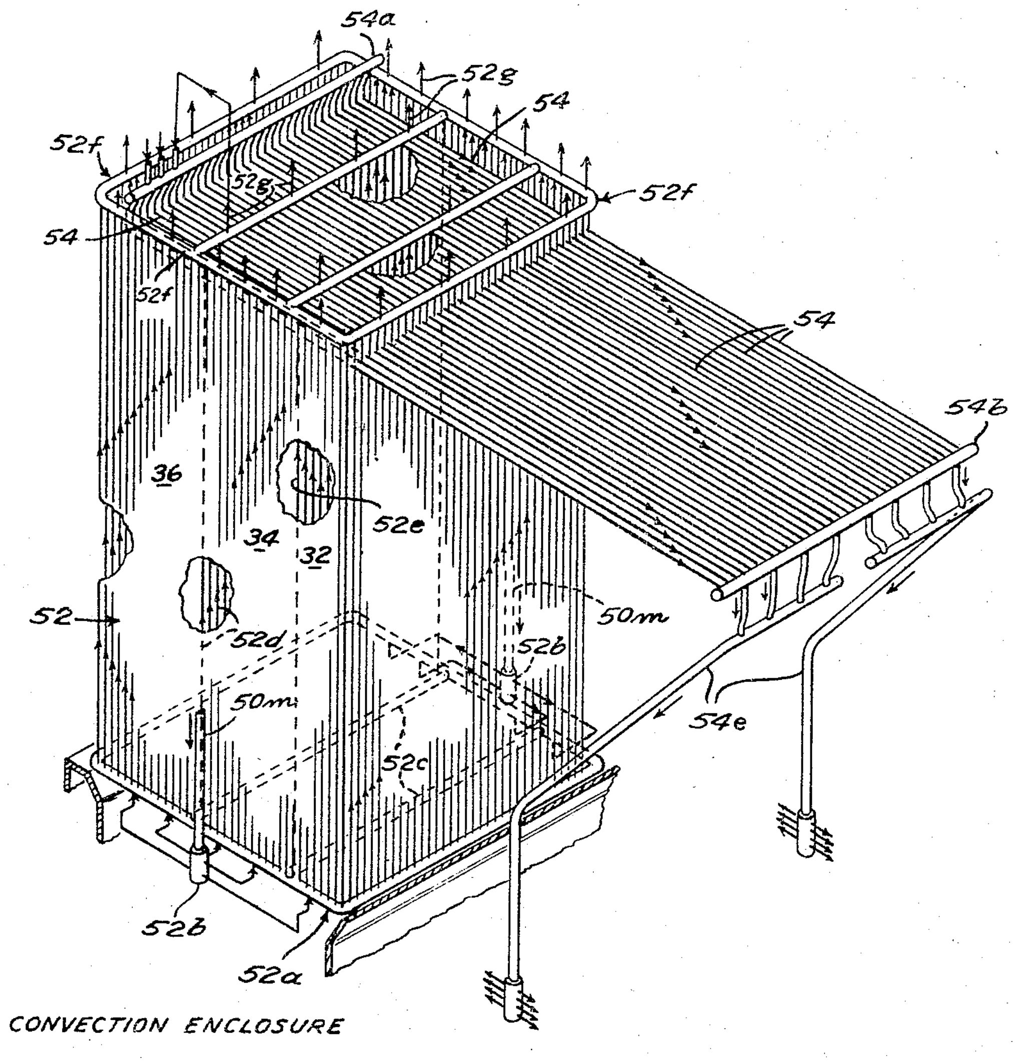
Figures 10, 11:
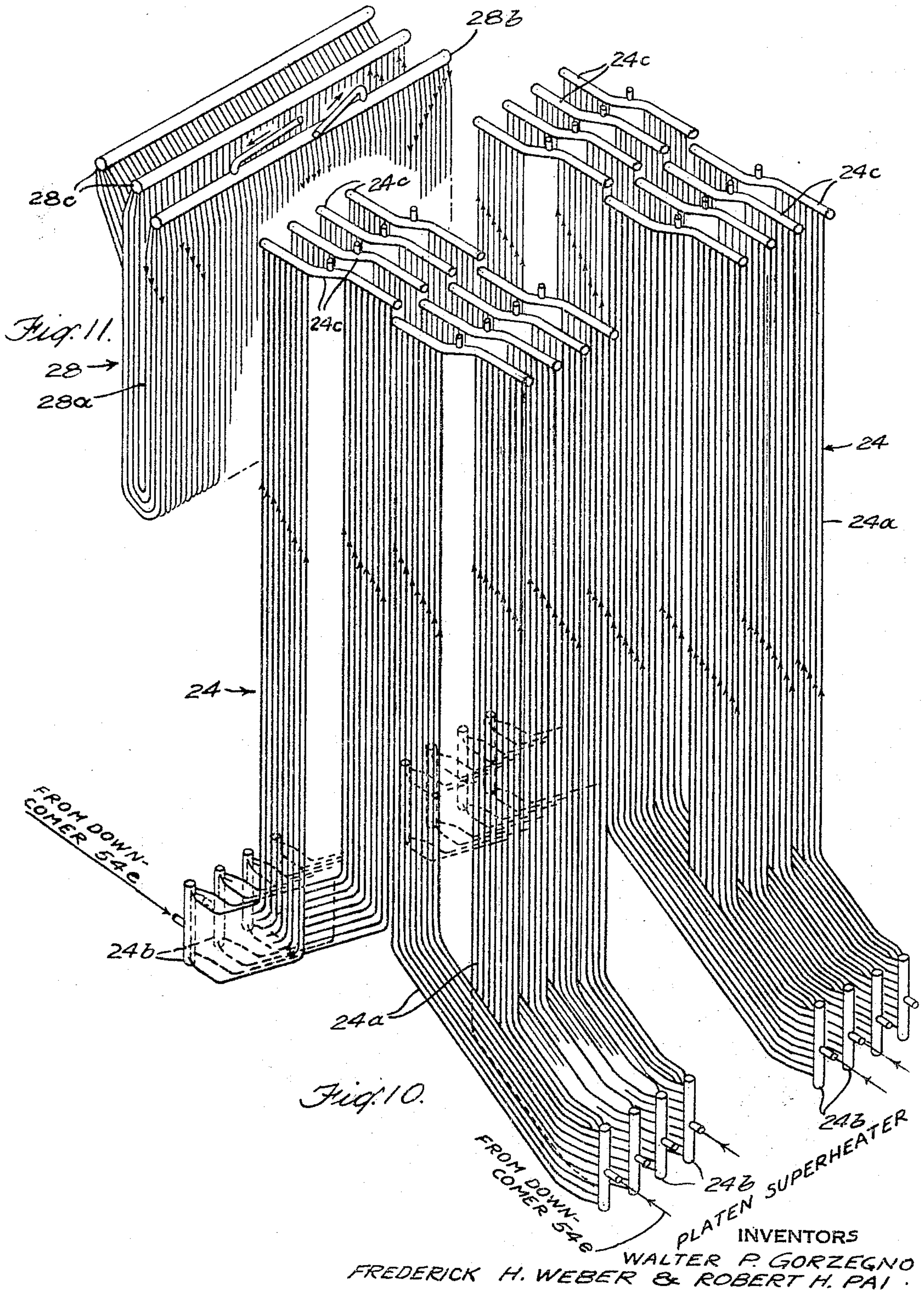
Figure 12:
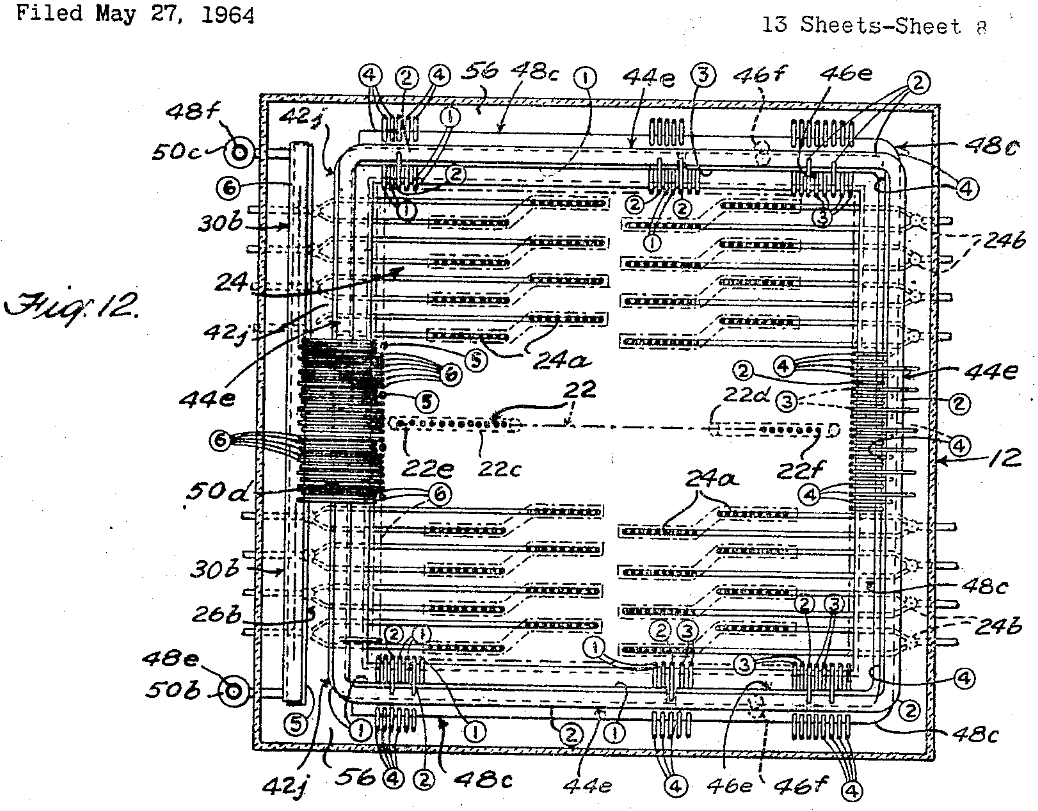
Figure 13:
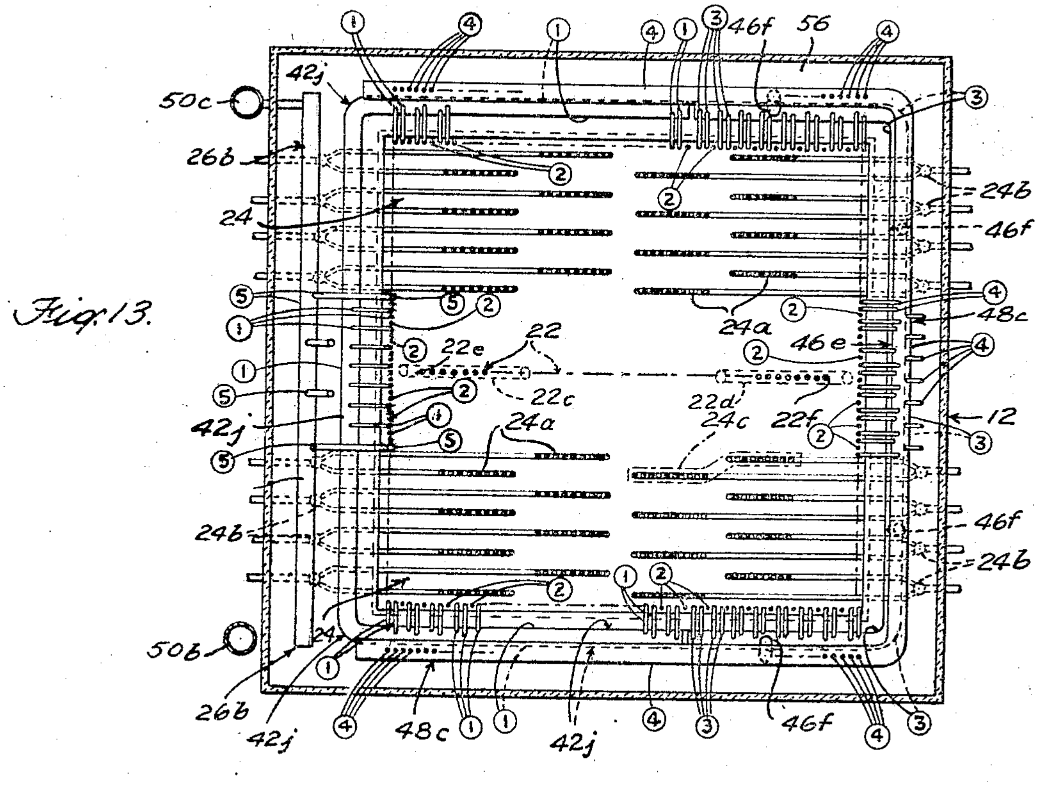
Figure 14A:
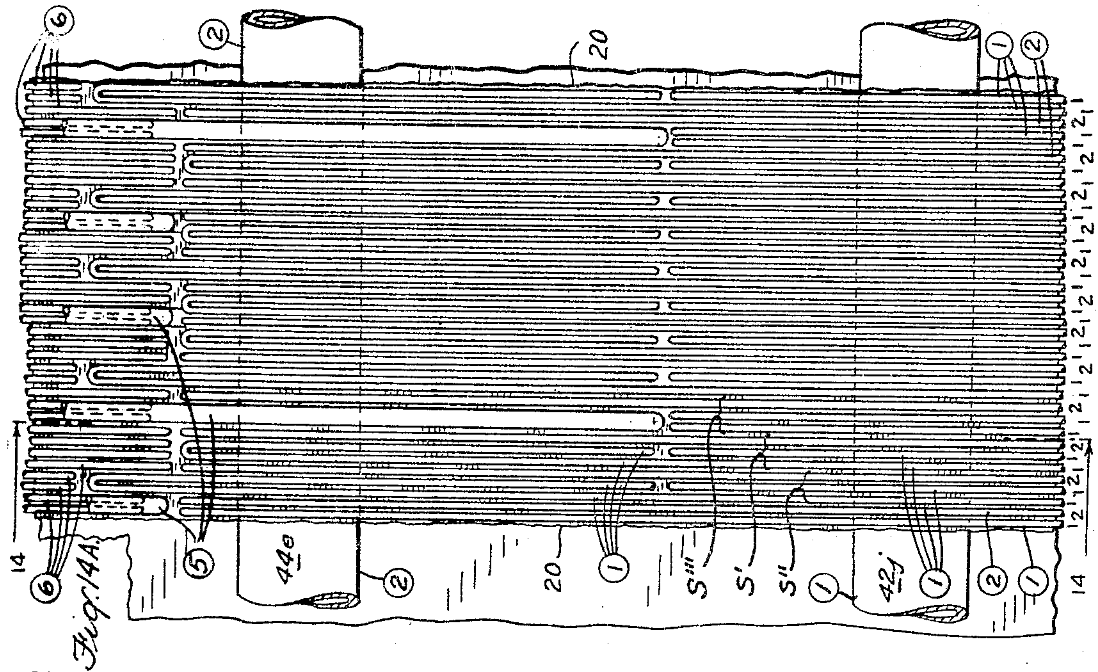
Figure 14:
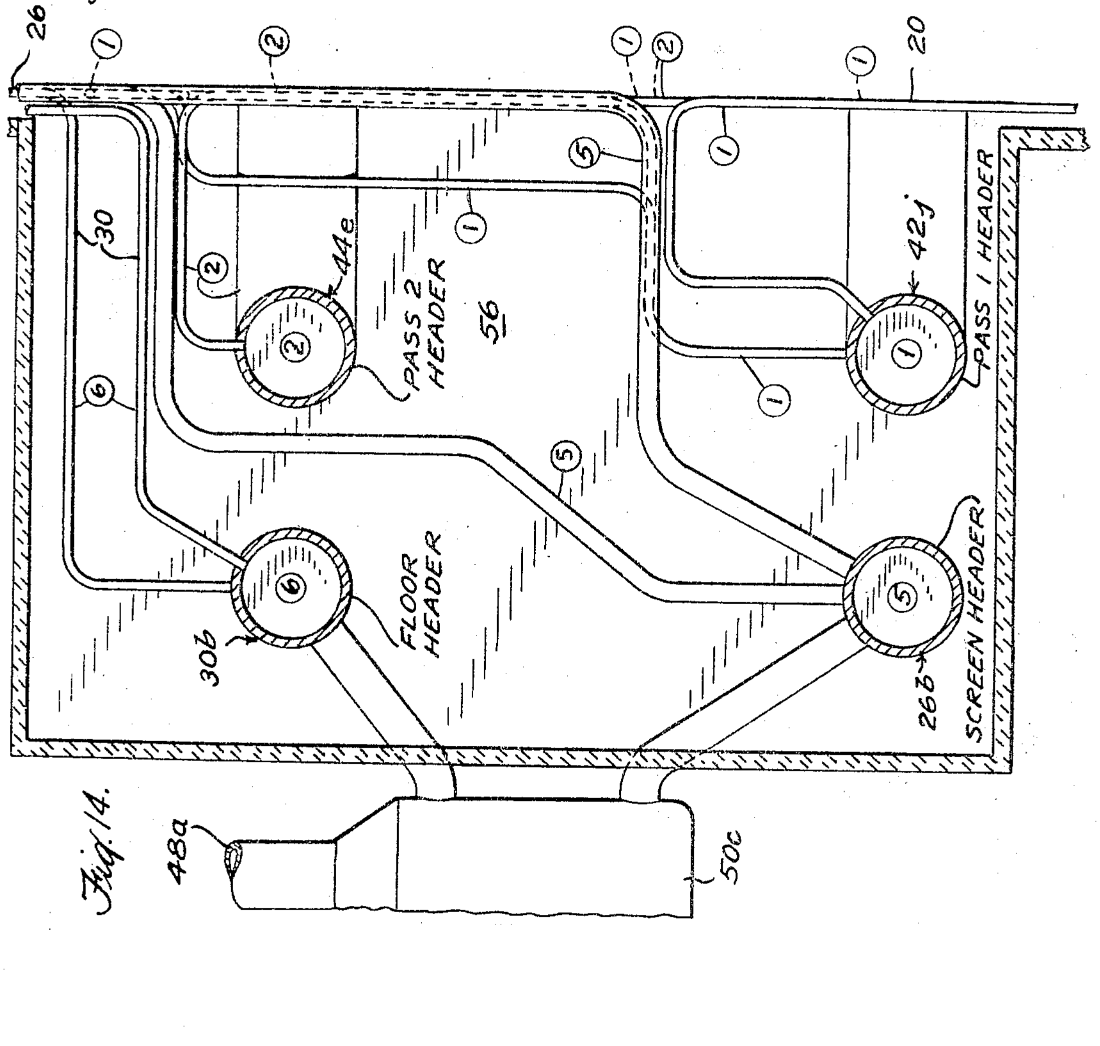
Figure 15A:
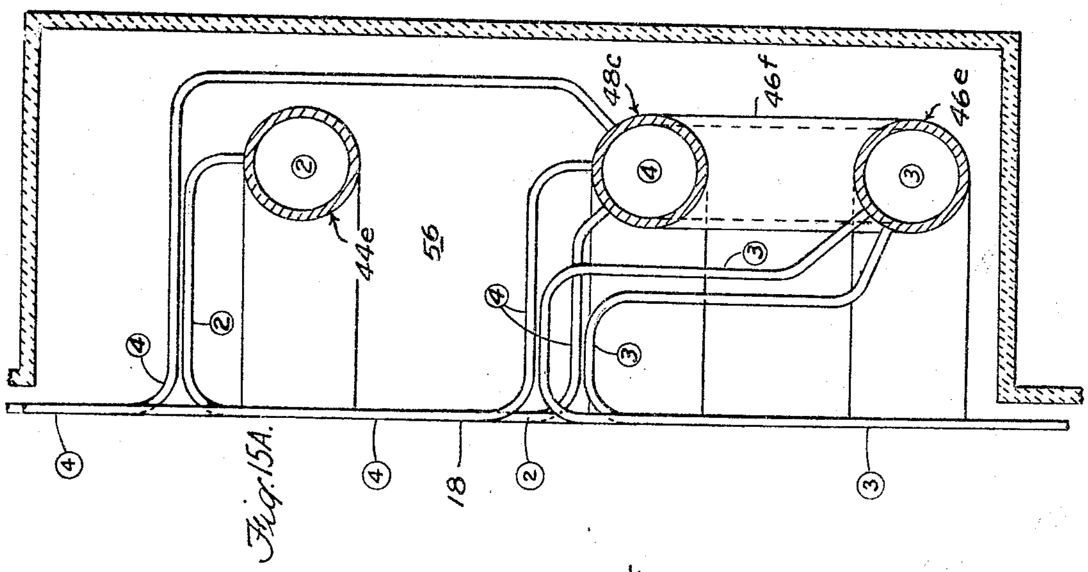
Figure 15:
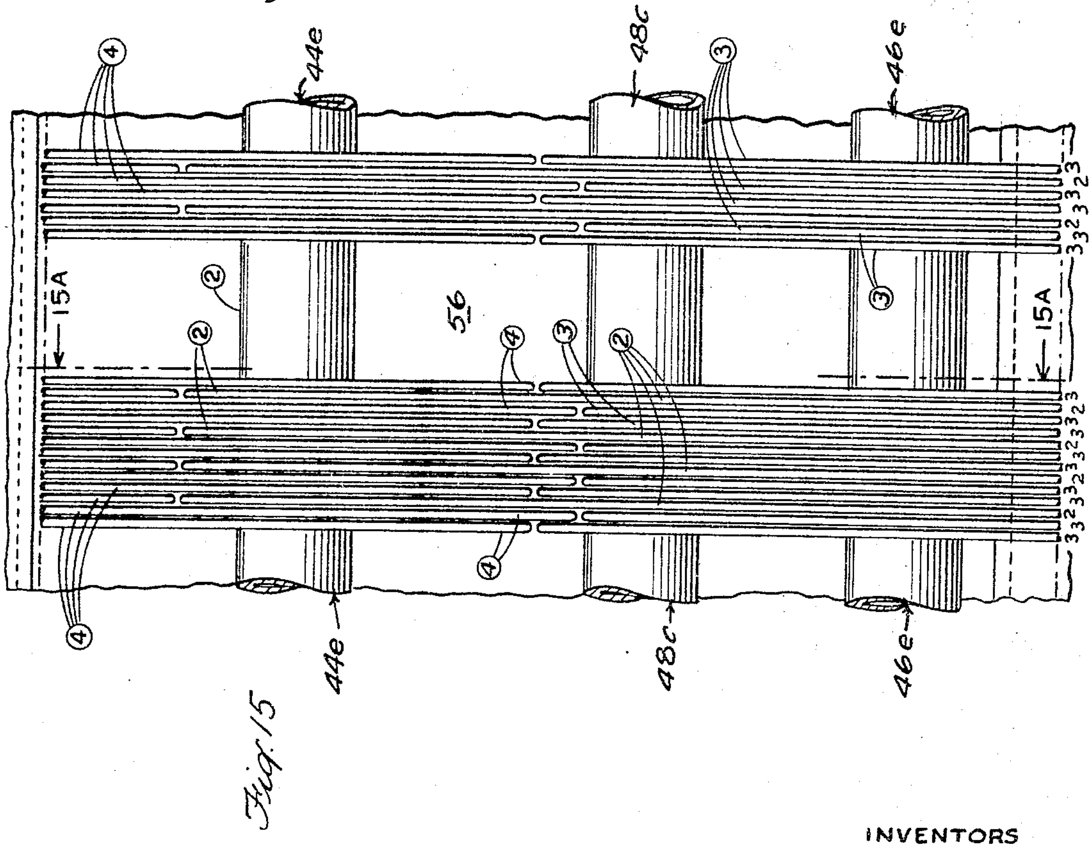
Figures 16, 17:
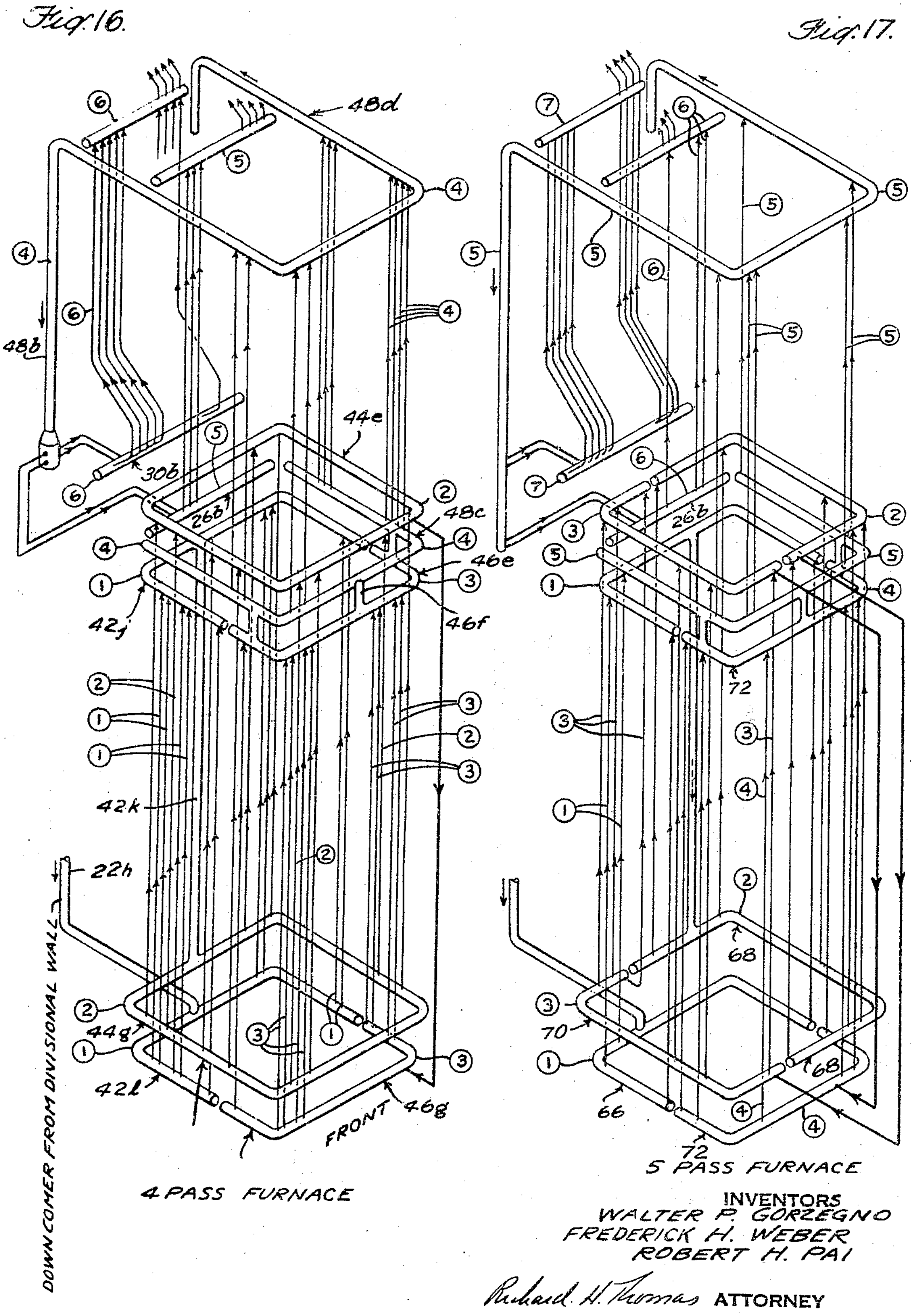
Figure 18A:
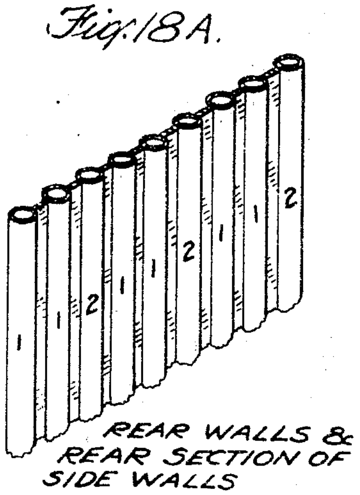
Figure 18B:
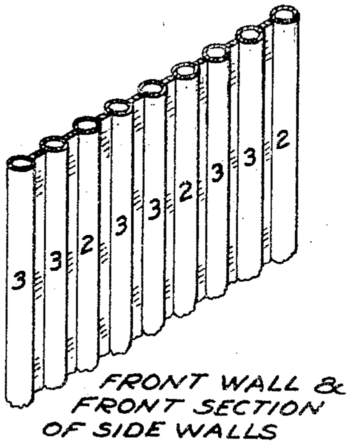
Figure 18C:
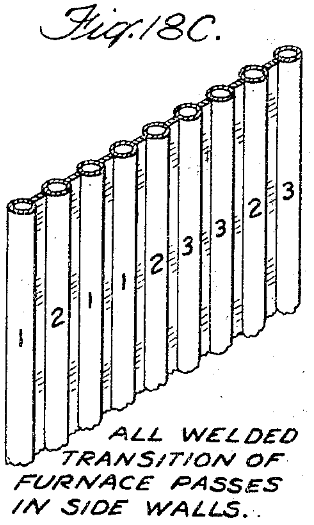
Figure 19:
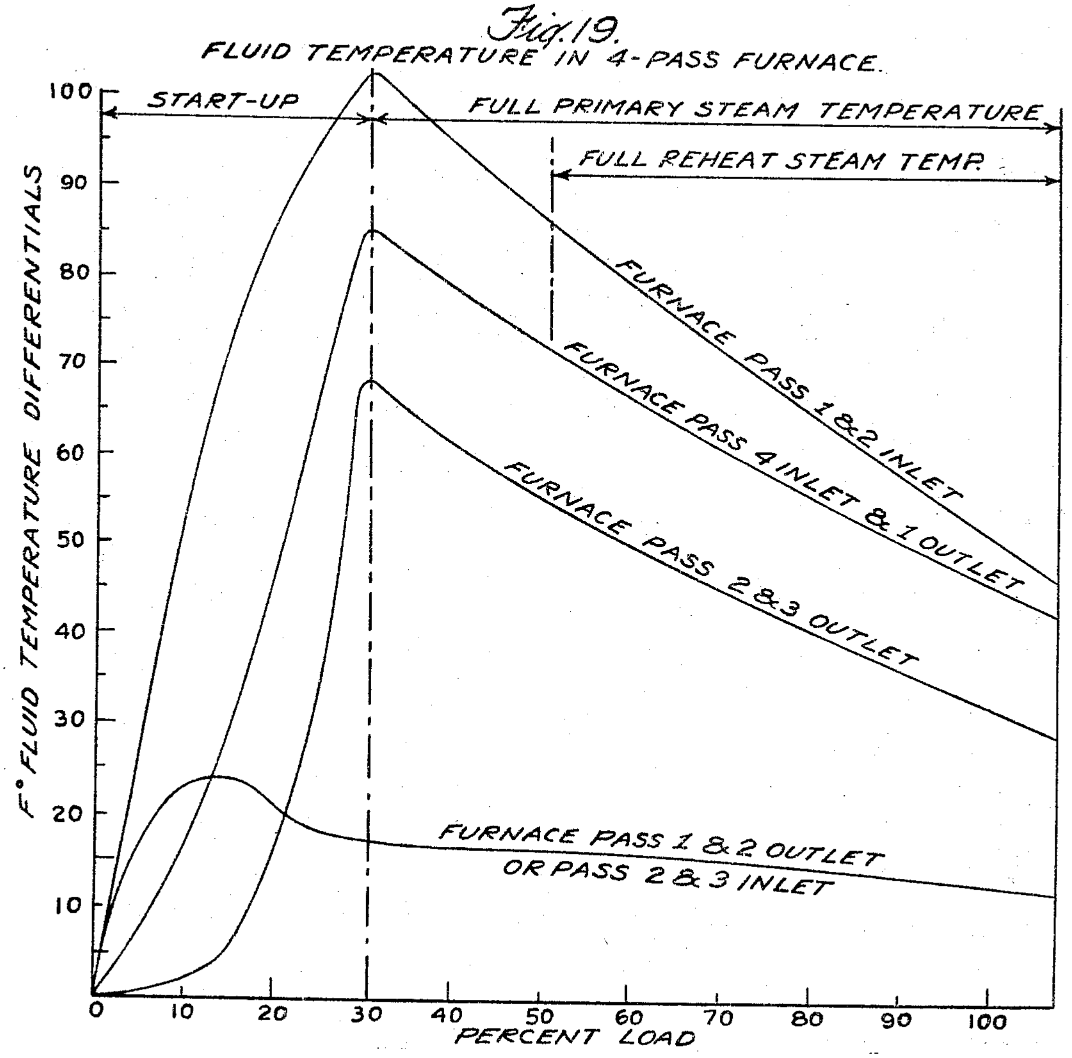
Figure 20:
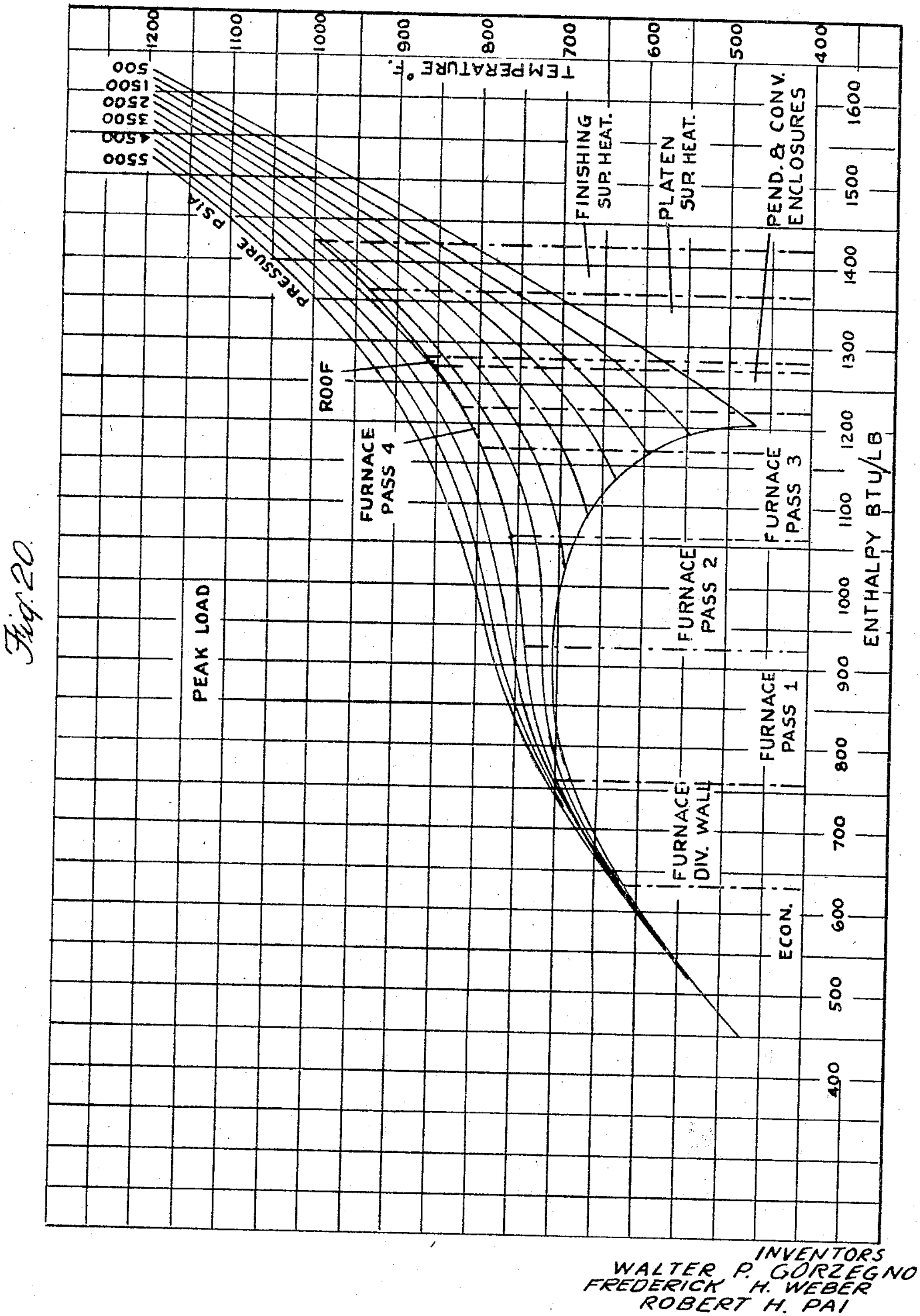

FIGURES 4, 5, 6, and 7 are oblique details of furnace enclosure passes for the steam generator illustrated in FIG. 1;

FIGURE 8 is an oblique detail of a first convection pass enclosure for the steam generator of FIG. 1;

FIGURE 9 is an oblique detail of a second convection pass enclosure and roof of the unit illustrated in FIG. 1;

FIGURES 10 and 11 are oblique details of the furnace platen arrangement and finishing superheater of the generator in FIG. 1;

FIGURES 12 and 13 are enlarged plan section views taken along lines 12 and 13 of FIG. 1 showing top and lower headers for the passes of FIGS. 4, 5, 6, and 7;

FIGURES 14 and 14A are enlarged section and front elevation views showing details of the horizontal joint headers for the rear furnace wall of the unit of FIG. 1;

FIGURES 15 and 15A are enlarged section and front elevation views showing details of the horizontal joint headers for the front furnace wall of the unit illustrated in FIG. 1;

FIGURE 16 is an oblique schematic view of a four pass furnace enclosure arrangement of an embodiment of the unit illustrated in FIG. 1;

FIGURE 17 is an oblique schematic view of a five-pass lternate furnace enclosure arrangement in accordance vith the invention;

FIGURES 18A, 18B, and 18C are detail views showing ube arrangements in the furnace walls for the four pass urnace enclosure arrangement illustrated in FIG. 1;

FIGURE 19 is a plot of fluid temperature differentials ›etween passes vs. percent load for the four pass furnace nclosure arrangement depicted in FIGURE 1; and FIGURE 20 contains a graph illustrating enthalpy pick-ıp in a four pass furnace in accordance with the invention.

Referring to FIG. 1, the embodiment of the invention ncludes a furnace 12 for a forced circulation steam gen-erating unit which has a rectangular horizontal cross-section and is vertically elongated. Burners 14 and 16 are lisposed in the lower portion of the furnace setting in he front wall 18 and rear furnace wall 20 respectively. A single liquid cooled division wall 22 extending from front o rear in the furnace divides the furnace into two equal cells and extends the entire height of the furnace. In the upper portion of the furnace, superheater platens 24 are disposed in a preferred arrangement for drainability and optimum metal temperature design.

The flue gases from the combustion of fuel, leave the furnace enclosure by passing over a furnace exit screen 26, flowing in cross-flow relationship over a finishing superheater bank 28 and through a rear screen 30. These gases then enter the convection section of the unit which consists of an economizer pass 32, a high pressure reheater pass 34, and a low pressure reheater pass 36. The quantity of flue gas flow through each of these three passes is controlled as necessary by outlet dampers 38 to achieve desired design flue temperatures. The flue gases exiting through the dampers 38 flow through an air heater 40, a dust collector (not shown) if coal fired, and then to the stack (also not shown).

Figure 2:
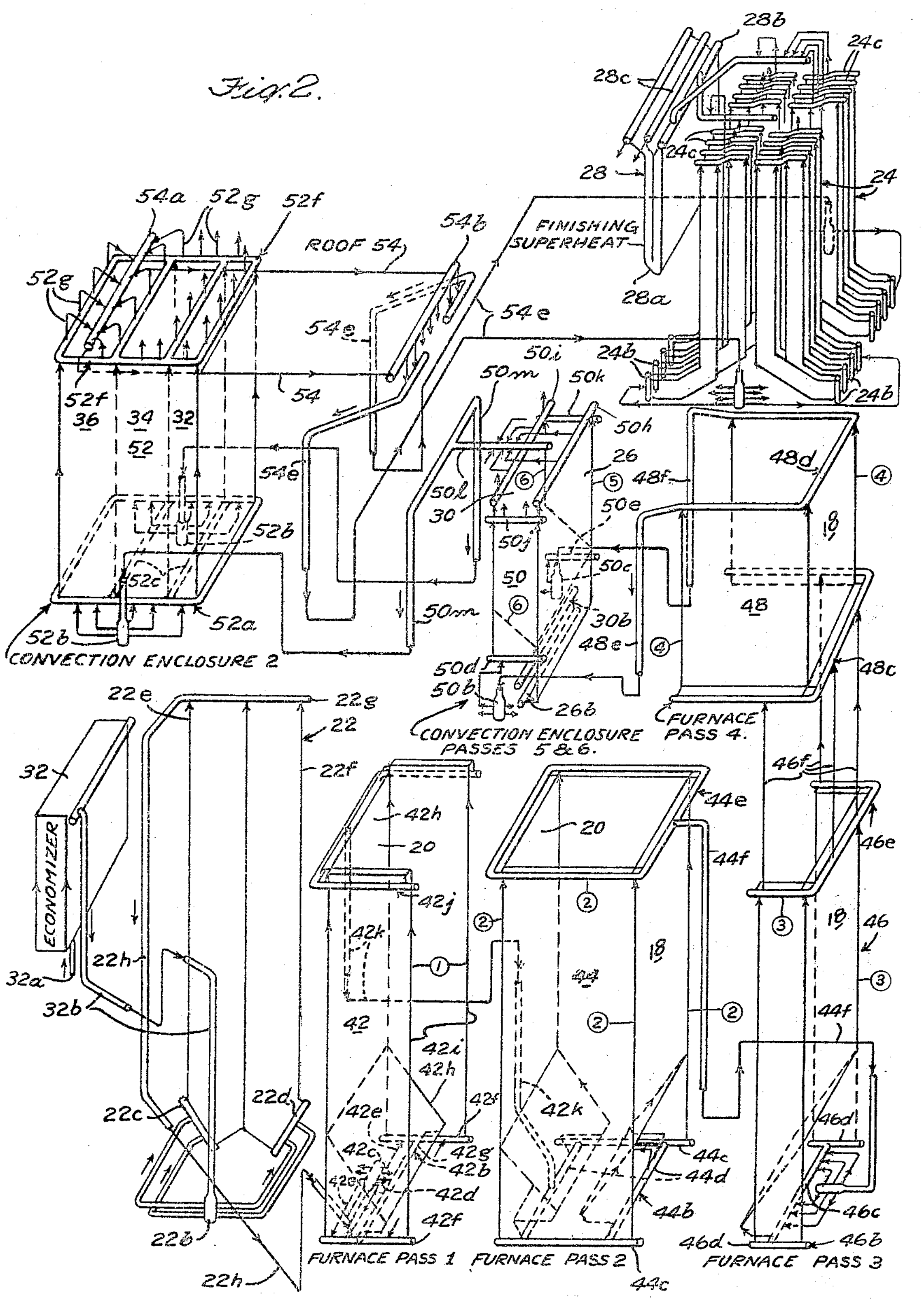
FIGURE 2 is an oblique schematic representation of the high pressure fluid flow path through the unit of FIG. 1.

FIG. 2 represents schematically the high pressure fluid flow routing for the unit. Feed water enters inlet 32*a* to the economizer 32, which is disposed in the flue passage therefor, and flows upwards existing to a downcomer pipe 32*b* which feeds the inlet for division wall 22. The fluid from the division wall then routes in a similar fashion to a furnace pass No. 1 (42), furnace pass No. 2 (44), and furnace pass No. 3 (46), disposed in the lower, high heat absorption section of the furnace. The fluid from furnace pass No. 3 (46) then routes to the inlet of furnace pass No. 4 (48), which as will be shown makes up the side walls and front wall of the upper portion of the furnace. The fluid flows upwards in furnace pass No. 4, and exits through two downcomers 48*e* and 48*f* to feed the inlet of a first convection pass enclosure (50), which forms the boundary wall enclosure (furnace exit screen 26 and rear screen 30) for the pendant finishing superheater bank 28. In a similar fashion, as described in the foregoing, the fluid routes to a second convection pass enclosure (52), roof tubes 54, platen superheater 24, and pendant finishing superheater 28, in that sequence.

For the purpose of clarity, in the drawings wherever appropriate, the headers and tubes are designated with the pass number with which they are associated encircled so as to be clearly visible. For instance the tubes and headers for pass No. 1 are designated as ①, those for passes Nos. 2, 3, and 4 as ②, ③, and ④ respectively. For the first convection enclosure, the designations ⑤ and ⑥ are used. In addition, a conventional numbering system is used for designating particular elements. For instance, pass ① upper header is designated item 42*j*. It is believed that this system of numbering will facilitate reference and cross-reference to the drawings of the application.

Figures 3, 6:
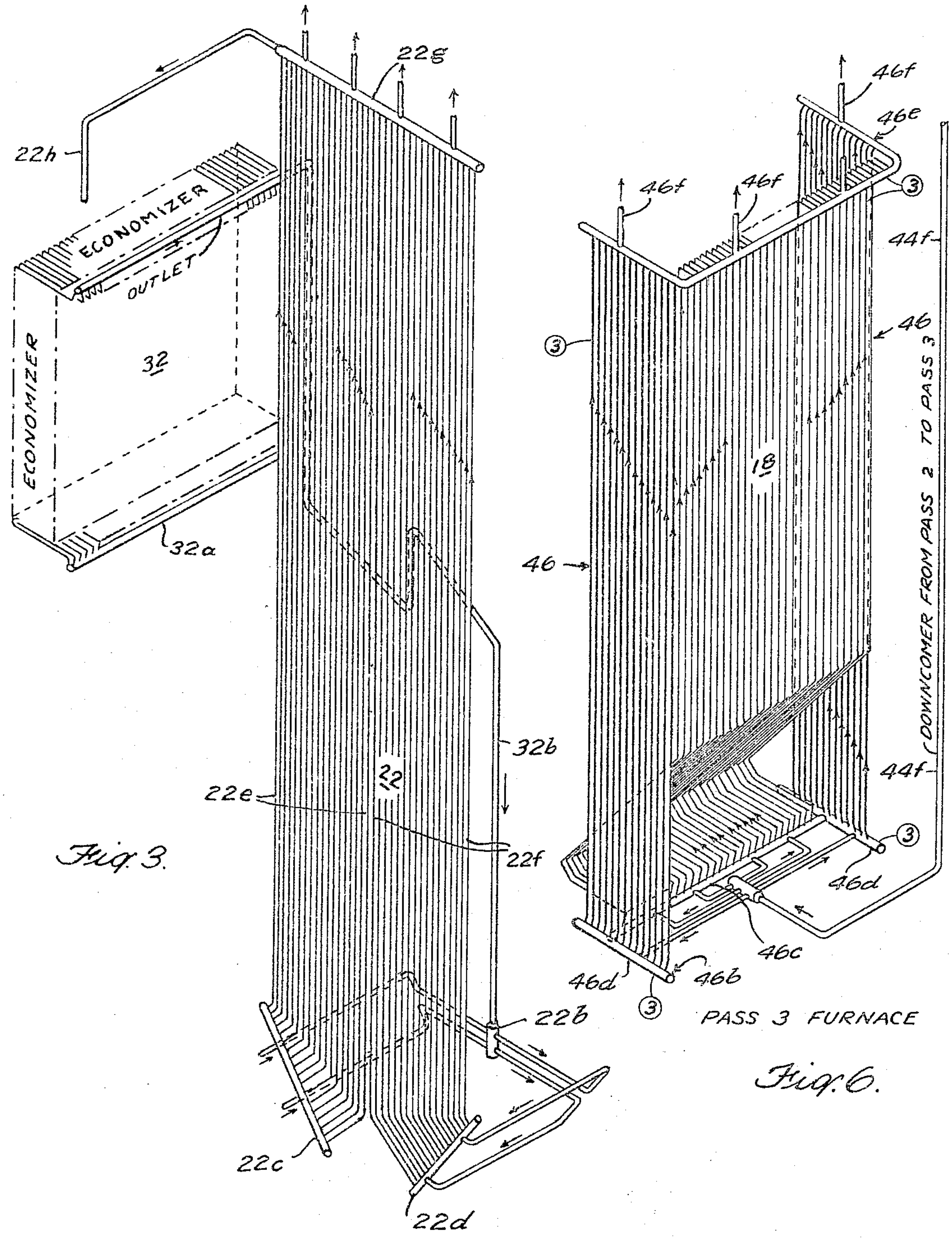
FIGURE 3 is an oblique detail view of the economizer and water cooled furnace division wall of the unit illustrated in FIG. 1.

Details of the furnace passes, convection enclosures, and superheating sections are shown more clearly in FIGS. 3–11. Referring to FIG. 3, showing the division wall 22, the downcomer 32*b* receiving flow from the economizer 32 leads to a T 22*b* from which the fluid divides and flows into elongated spaced apart headers 22*c* and *d* attached to and from which sides 22*e* and *f* of the division wall extend. The headers 2*c* and *d* are inclined in the shape of a V conforming to the bottom of the furnace (FIG. 1).

Figures 4, 5:
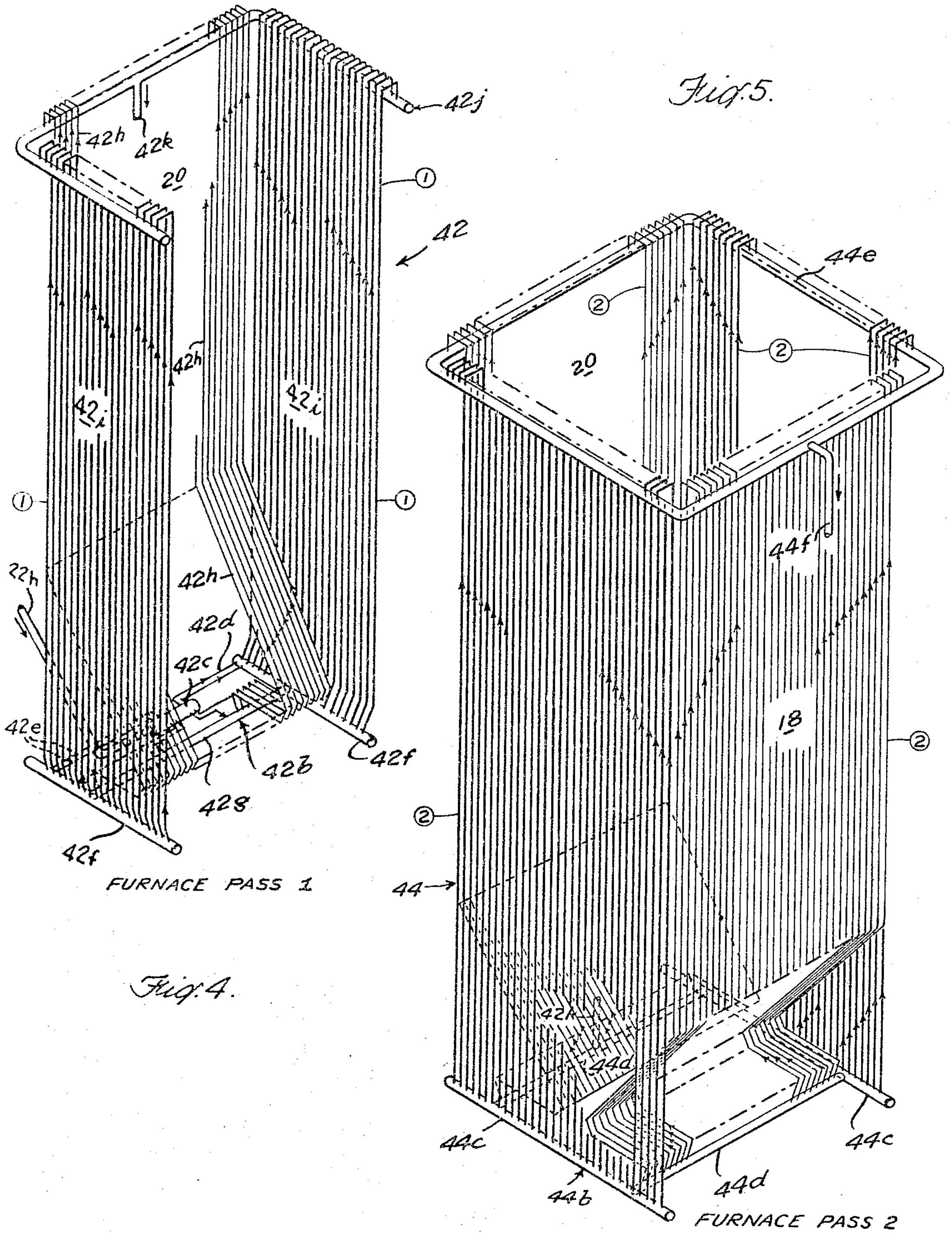

From the top of the division wall, a single straight header 22*g* leads to a downcomer 22*h* transmitting the fluid to furnace pass No. 1 (FIG. 4).

In the furnace pass No. 1, the fluid is transmitted to an I-shaped header 42*b*, via a distributing T 42*c* and lines 42*d* and *e* leading to legs 42*f* and stem 42*g* respectively of the header. The stem 42*g* feeds a wall 42*h* which makes up the rear sloping bottom (FIG. 1) and rear wall 20 of the furnace 12. The legs 42*f* of the header feed tubes 42*i* which make up the side walls of the lower portion of the furnace. At the top of the pass No. 1, the tubes feed to a U-shaped header 42*j*. From the header 42*j* the fluid flows via a centrally disposed downcomer 42*k* to the furnace pass No. 2 (FIG. 5).

Feeding the furnace pass No. 2 is a duble I-shaped header 44*b* having leg portions 44*c* and spaced parallel stems 44*d* extending between the legs 44*c*. The two stems 44*d* feed tubes which make up the V-shaped bottom of the furnace 12 (FIG. 1) and the front and rear walls 18 and 20 of the furnace. The tubes for pass No. 2 in the rear wall 20 of the furnace are mixed with those of pass No. 1 in the sequence noted in FIG. 18A, there being one tube from pass No. 2 succeeded by two tubes from pass No. 1. The legs of the header feed tubes which make up the side walls of the furnace, the tubes of pass No. 2 in the rear portion of the furnace being mixed with those of pass No. 1, also in the sequence shown in FIG. 18A, one tube of pass No. 2 being succeeded by two tubes of pass No. 1. The tubes in pass No. 2 in the side walls in the front portion of the furnace are mixed with those of pass No. 3, in a manner as will be shown, and in the sequence shown in FIG. 18B, with two tubes of pass No. 3 followed by a single tube of pass No. 2.

From the top of pass No. 2, from a rectangular-shaped header 44*e* the fluid flows through a single downcomer 44*f* to furnace pass No. 3 (FIGS. 2 and 6). The pass No. 3 utilizes an I-shaped header 46*b*, the stem 46*c* of the header feeding tubes making up the front wall 18 of the furnace, the legs 46*d* feeding tubes making up the side walls, front section thereof, of the furnace. As mentioned above, the tubes of pass No. 3 intermix in the side walls with the tubes of pass No. 2 in the sequence of FIG. 18B. They also intermix in the front wall 18 in this sequence with the tubes of pass No. 2; those leading from headers 44*d* (FIG. 5).

From the top of pass No. 3, from U-shaped header 46*e*, the fluid flows upwardly in four risers 46*f*, to a similarly shaped header 48*c* of pass No. 4 (FIG. 7). The header 48*c* for the pass No. 4 feeds a U-shaped bank of tubes making up the front wall 18 and side walls in the upper portion of the furnace, the tubes leading to an upper header 48*d* having a shape corresponding to that of the lower header and the bank of tubes.

Details of the first convection enclosure, passes Nos. 5 and 6, into which fluid from the furnace pass No. 4 is transmitted, are shown in FIG. 8. The fluid streams from the downcomers 48*e* and *f* enter on opposite sides of the furnace, distributing bottles or nozzles 50*b* and 50*c*, also on opposite sides of the furnace, each bottle or nozzle having six connections leading to headers 26*b*, 30*b* and 50*d* and *e* respectively for front screen tubes 26, rear screen tubes 30, and the side walls 50*f* and *g* of the enclosure. For purposes of clarity, the front screen tubes 26 are designated as pass No. 5, and the rear screen tubes 30 as pass No. 6. The headers 26*b* and 30*b* extend completely across the width of the furnace and are each fed via four of the connections, two from each distributing nozzle 50*b* and 50*c*, so that two from each distributing nozzle go to the header 26*b* and two to the header 30*b*. The two remaining connections from each nozzle, four in all, feed the separate headers **50*d* and 50*e* for the opposite side walls of the enclosure. It should be noted that the tubes for the rear wall of the enclosure, pass No. 6, extend for a short distance 50 contiguous with the front wall 26 of the enclosure, and with the tubes 26 make-up the upper portion of the rear wall 20 of the furnace. They then extend upwardly and rearwardly to define the sloping bottom of the enclosure. In a later description details for this tube arrangement will become more apparent. Where the gas flow is across the rear wall 30, the tubes are spread apart as shown to permit this flow. In the front wall 26 the tubes also are spread apart to permit the flow of gas. Details of the tube pattern in this are a matter of design. The upper header arrangement for the enclosure is substantially the same as that for the bottom of the enclosure, with connections between the parallel transverse headers 50*h* and 50*i* for the front and rear walls and cross headers 50*j* and 50*k* for the side walls. Connections lead from the headers to a mixing tee 50*l*; the latter dividing the flow into parallel downcomers 50*m***.

The second convection enclosure and the roof tubes are shown in FIG. 9. The header arrangement **52*a* for the second enclosure is somewhat similar to that for the first enclosure with the headers being shaped to feed tubes defining a rectangular shaped enclosure. In particular, the header is in the shape of a rectangle fed by tees 52*b* on opposite sides of the enclosure. Also included are cross headers 52*c* feeding division walls 52*d* and 52*e* dividing the enclosure into the economizer, reheater and superheater passes 32, 34, and 36 for the gas flow. The upper header 52*f* has a configuration similar to that of the lower header, also to the enclosure, and is provided with connections 52*g* leading to a single transverse header 54*a* feeding the roof tubes 54. The roof tubes in turn terminate in a single header 54*b*, from which downcomers 54*e* lead transmitting the fluid to the platen superheater 24, shown in FIG. 10, and the finishing superheater 28**, shown in FIG. 11.

The platen superheater, FIG. 10, consists of a plurality of banks of tubes **24*a* off-set from each other, having a somewhat J-configuration, the banks being arranged to uniformly occupy the upper cells of the furnace 12 on opposite sides of the division wall 22 as shown in FIGS. 12 and 13, but at the same time being arranged to permit the flow of gases in the upper part of the furnace. The J-configuration permits the superheater tubes to be completely drainable, the tubes being fed at the inlet end by a plurality of vertical headers 24*b* feeding pairs of banks of the superheater, and terminating at the outlet end in horizontal headers 24*c* appropriately connected to the finishing superheater bank. The latter comprises a series of U-shaped tubes 28*a*, leading from a single inlet header 28*b* and terminating in parallel headers 28*c***.

The steam generator illustrated is top supported by a suitable framework not shown permitting free expansion. This means that the tubular elements of the vapor generator must be suspended from the top, and the lower passes suspended from the upper pass or passes. For instance, the platen superheater elements 24 are suitably suspended from the top, as well as the furnace pass No. 4, and the convection enclosure passes Nos. 5 and 6. In the embodiment illustrated, the furnace passes Nos. 1, 2 and 3 are suitably connected to the passes 4–6 so that they also are suspended from the top.

FIGS. 12, 13, 14, 14A, 15, and 15A illustrate the manner in which this is accomplished, FIGS. 14 and 14A illustrating the arrangement with respect to the rear wall 20, FIGS. 15 and 15A illustrating the arrangement with respect to the front wall 18. Reference can also be had to FIG. 1 for purpose of illustration.

Referring to FIGS. 14, 14A and FIG. 1, an annular recess 56 is formed in the rear wall 20, and the headers **42*j* and 44*e* for the first and second passes (FIGS. 4 and 5), 30*b* for the floor of the first convection enclosure (pass No. 6, FIG. 8), and 26*b* for the screen tubes (pass No. 5, FIG. 2) are located within the recess. It will be recalled that the rear wall of the furnace is composed, in the lower portion of the furnace, of tubes from passes Nos. 1 and 2, and in the upper portion of the furnace, of the screen tubes 26 and 30 of the convection enclosure 50. The headers 42*j* and 44*e* for the passes Nos. 1 and 2 are disposed immediately above each other in the front of the recess, with the headers 30*b* and 26*b* for the floor and screen tubes (passes 6 and 5) in the rear part of the recess. This arrangement also is shown in FIGS. 12 and 13. For instance, in FIG. 13, the screen tube header 26*b* (pass 5) is shown as an elongated straight member in the back of the recess with the U-shaped header 42*j* for pass No. 1 in front of it. Above, in FIG. 12, the straight header 30*b* (pass 6) and the rectangular header 44*e* (pass 2**) are located.

Referring again to FIGS. 14 and 14A, the tubes of pass No. 1 in the lower part of the furnace mix with those of pass No. 2, the grouping being two tubes of pass No. 1 followed by a single tube of pass No. 2. The tubes of pass No. 2 all bend at right angles near the top of the recess 56 to enter the recess, extending to header **44*e*. In each 1–1–2 group, at least one tube of pass No. 1 bends at right angles about a third of the way up the recess, enters the recess and extends to header 42*j*. The remaining tube of pass No. 1 for each group may either be coextensive with and extend to the point of entry of the tubes of pass No. 2 (sequence S′, FIG. 14A), or extend beyond this point of entry (sequence S″) or below it, (sequence S‴). If the tubes are coextensive with or longer than those of pass No. 2, (sequences S′ and S″), they make a U-band and return to about the point of entry, supra, of the other tube of pass 1, about a third of the way up, bending at right angles to enter the recess. In the third instance (sequence S‴), this remaining tube of each grouping enters the recess with the first tube of pass No. 1**, at the above-mentioned point of entry for the first tube, about a third of the way up the recess.

From the top down, the screen tubes leaving header **26*b*, given the designation ⑤, follow two paths, one out of three extending down to about the point of entry, above-mentioned, about a third of the way up the recess, the remaining leaving near the top of the recess adjacent the tubes of pass No. 2. Those continuing down the face of the recess are strength-welded with the tubes of pass No. 2 along portions which are coextensive. The other screen tubes of pass 5 are strength-welded to those tubes of pass No. 1** which extend beyond the upper point of entry.

Mixed with the screen tubes and entering the recess near the top are the convection enclosure tubes originating from header **30*b*, designated as ⑥. These tubes are also welded to certain ones of pass No. 1. It should be noted that some of the tubes of the pass No. 6 are spaced behind, and some aligned with, the screen tubes of pass No. 5**.

In tht above way, the lower passes Nos. 1, and 2 are supported by the upper tubes of passes Nos. 5 and 6, but details of the arrangement may be a matter of design.

In addition to functioning as a support connection, the tubes of the passes Nos. 1, 2, 5, and 6 screening the recess 18 form a gas-tight enclosure. This arrangement occurs only in the rear wall of the furnace as shown in FIGS. 12 and 13.

For the front wall and sides of the furnace, FIGS. 15 and 15A, the situation is somewhat different. Specifically, for the front wall and front portions of the side walls, it will be recalled that the tubes of pass No. 2 are intermixed with those of pass No. 3. At a point about halfway up the recess 56, the tubes of pass No. 3 divide and lead into the recess at two levels, one slightly above the other, to the header **46*e* for pass No. 3. Those for pass No. 2** extend on upwardly to near the top of the recess before leading into the recess to header 44e, for pass No. 2, also near the top of the recess. From the top, the tubes for pass No. 4 split, some entering the recess near the top adjacent the tubes for pass No. 2, and some continuing on downward entering the recess in the area of the header 48c for pass No. 4. The tubes of the various passes are suitably strength-welded together so that the tubes of pass No. 4 support those for passes Nos. 2 and 3.

The invention has been described with reference to a V-shaped hopper bottom. Principles of the invention are equally applicable to a flat bottom furnace, illustrated in this respect in FIG. 16. The essential difference between the embodiment of FIG. 16 and the embodiment of FIG. 2 is the arrangement of headers near the bottom. For the vapor generator of FIG. 16, the furnace pass No. 1 is fed by a U-shaped header 42L, the ends of which abut another U-shaped header 46g for pass No. 3. The header 46g for pass No. 2 has the configuration of a square. It is noted that the rear wall and rear portions of the side walls are composed of tubes of passes Nos. 2 and 1, and those for the front wall of tubes of passes Nos. 2 and 3. The upper headers for these passes, 42j, 46e, and 44e, have the same configuration as those for the embodiment of FIG. 2, and in other respects, the generator of FIG. 16 resembles the generator of FIG. 2.

FIG. 17 illustrates the invention with respect to a five pass design as compared to the four pass design of FIGS. 16 and 2. In the FIG. 17 example, pass No. 1 feeds the rear wall and rear portions of the side wall, and utilizes a U-shaped lower header 66. Pass No. 2 makes up one side wall, portions of the front and rear walls abutting the side wall, utilizing a lower U-shaped header 68, and pass No. 3 makes up the opposite side wall and portions of the front and rear walls adjoining this side wall, utilizing another U-shaped header 70. Pass No. 4 utilizes a fourth U-shaped header 72, and makes up the front wall and front portions of the side walls. Accordingly, the rear wall will be composed on one side of tubes of passes Nos. 1 and 3, and on the other side of tubes of passes Nos. 1 and 2. The front wall will be composed of passes Nos. 4 and 3, and 4 and 2, respectively. The side walls will be composed of passes Nos. 1 and 3 and Nos. 1 and 2 towards the rear, and passes Nos. 4 and 3, and Nos. 4 and 2 respectively towards the front.

It is contemplated that a membrane type wall construction will be used wherein the furnace enclosure is formed by welding adjacent tubes together along their length.

For a forced flow once-thru generating unit where supercritical water and steam are employed, suitably sized pipe connections may be used to connect the multiple passes, with pass outlet and inlet headers properly sized to limit fluid flow unbalance caused by fluid end flow in these headers.

Advantages of the invention should now be apparent. FIG. 19 illustrates, in the four pass furnace of FIG. 2, the fluid temperatures differentials in the heating cycle at various loads. Because of the plurality of furnace circuits and careful location of these circuits, in no section of the furnace does the difference in temperature between adjacent tubes exceed 100° F. By limiting temperature differentials to 100° F., resulting thermal stresses are kept to low levels giving good structural design. This is achieved without the necessity of constant operation of a gas recirculation fan.

In addition, the circuit arrangement is such that the fluid enthalpy pick-up of a given enclosure pass is small (as shown by FIG. 20) and well within limits so that fluid flow unbalance caused by absorption or furnace heat upset is held to a minimum. In this respect, a full mix between passes prevents carryover of fluid temperature and flow unbalance from one pass to another, and the disposition of passes in the furnace allows a greater tolerance for uneven heat absorption around the periphery of the furnace.

Also, the disposition of passes provides an upflow in all tubes in the furnace periphery giving good circuit characteristics from a stability and sensitivity point of view. In this respect, the passes can be designed for optimum fluid cooling mass flows—lbs./hour-square feet—to effect the desired cooling of tube metal, whereby minimum fluid pressure drop can be achieved in the unit. Representative mass flows are as follows:

TABLE 1.—4-PASS FURNACE

| Pass | G (mass flow), lbs./hr.-sq. ft. | Cold Water Velocity, ft./sec. at 62° F. |
|---|---|---|
| 1 | $1.8\times10^6$ | 8.1 |
| 2 | $2.1\times10^6$ | 9.5 |
| 3 | $2.5\times10^6$ | 11.3 |
| 4 | $1.0\times10^6$ | 4.5 |

TABLE 2.—5-PASS FURNACE

| Pass | G (mass flow), lbs./hr.-sq. ft. | Cold Water Velocity, ft./sec. at 62° F. |
|---|---|---|
| 1 | $1.6\times10^6$ | 7.1 |
| 2 | $1.78\times10^6$ | 7.9 |
| 3 | $2.17\times10^6$ | 9.7 |
| 4 | $2.5\times10^6$ | 11.1 |
| 5 | $0.696\times10^6$ | 3.1 |

The unique platen superheater arrangement in the upper portion of the furnace enclosure is fully drainable and has parallel flow of heating gases and cooling fluid to minimize tube metal temperatures as compared to those experienced in typical pendant platen arrangements. Also, the unique mix header arrangement permits the transfer of structural load from the plurality of passes in the lower furnace to the signal upper furnace pass and furnace screen.

While in accordance with the provisions of the statute, we have illustrated and described herein the best form of the invention now known to us, those skilled in the art will understand that changes may be made in the form of the apparatus disclosed without departing from the spirit and scope of the invention covered by the claims, and certain features of the invention may sometimes be used to advantage without a corresponding use of other features.

What is claimed is:

1. In a forced-flow vapor generator which comprises an all-welded boundary wall construction for a rectangular furnace enclosure having opposite first and second walls and side walls therebetween, the enclosure including upper and lower portions and burners in the lower portion in at least one of said first and second walls, a circuit arrangement for the boundary wall comprising:

pass means defining at least three flow passes in series in said lower portion for the fluid being heated, said passes including first and last passes and at least one intermediate pass, the total heating surface in said pass means achieving a predetermined enthalpy pick-up;

one of said first and last passes constituting a substantial portion of the wall opposite said burner means, the other of said first and last passes constituting a substantial portion of the wall which includes said burner means;

the intermediate pass occupying a substantial portion of the side walls to provide a means for transition from the expansion and contraction of the first pass relative that of the last pass;

intermediate mixing points between successive flow passes limiting the fluid enthalpy pick-up in each pass to a predetermined amount;

each pass comprising a plurality of parallel up-flow tubes and having tubes disposed in at least approximately half of the periphery of the furnace wherein the tubes of the first and last passes are interspersed with those of the intermediate passes;

external downcomers between the lower passes;

the tubes of the passes being arranged for the upflow of the fluid being heated;

an additional pass in the upper portion of the furnace; and at least one riser connecting said additional pass in series with the last pass of those in the lower portion of the furnace;

each of the passes occupying a sufficient part of the furnace enclosure lower portion to achieve that enthalpy pick-up by which the difference in temperature between adjacent tubes in the all-welded enclosure does not exceed approximately 100° F.

2. In a forced-flow vapor generator which comprises an all-welded boundary wall construction for a rectangular furnace enclosure having opposite first and second walls and side walls therebetween, the enclosure including upper and lower portions and burners in the lower portion in at least one of said first and second walls, a circuit arrangement for the boundary wall comprising;

pass means defining three flow passes in series in the lower portion of the furnace for the fluid being heated, the first and third passes comprising a plurality of parallel upflow tubes which are disposed in and comprise substantial portions of the opposite first and second walls of the furnace enclosure lower portion, the second pass comprising a plurality of parallel upflow tubes disposed in the entire periphery of the furnace enclosure lower portion interspersed with the tubes of the first and third passes in the sequence of two tubes of the first and third passes for each tube of the second pass, the second pass tubes however constituting substantial portions of the side walls to provide a means for transition from the expansion and contraction of the first pass relative that of the third pass;

headers intermediate each of the three passes providing intermediate mixing points limiting the fluid enthalpy pick-up in each pass to a predetermined amount;

external downcomers between the passes;

a fourth pass in the upper portion of the furnace comprising a plurality of parallel upflow tubes which are disposed in a substantial portion of the periphery of the furnace, the remaining portion of the periphery being for the exit of hot gases from the furnace;

the total heating surface in said flow passes achieving a predetermined enthalpy pick-up in the furnace enclosure, each of the passes occupying a sufficient part of the furnace enclosure periphery so that the difference in temperature between adjacent tubes in the all-welded enclosure does not exceed approximately 100° F.

3. In a forced-flow vapor generator according to claim 11 wherein the headers for the passes each are approximately co-extensive and aligned with the furnace periphery fed thereby.

4. In a forced-flow vapor generator according to claim 12 wherein the furnace is a rectangular enclosure provided with a V-bottom for opposing walls of the furnace, the lower headers for the first and third passes having an I configuration, the lower header for the second pass having a double connecting eye (II) configuration.

5. In a forced-flow vapor generator according to claim 4 wherein the tubes of the fourth pass are disposed in three of the four walls of the generator, the headers therefor having an approximately U-shaped configuration.

6. In a forced-flow vapor generator which comprises an all-welded boundary wall construction for a rectangular furnace enclosure having opposite first and second walls and side walls therebetween the enclosure including upper and lower portions and burners in the lower portion in at least one of said first and second walls, a circuit arrangement for the boundary wall comprising;

pass means defining in series in the lower portion of the furnace for the fluid being heated, each pass comprising a plurality of parallel upflow tubes occupying approximately 180° of the periphery of the furnace, each pass further being disposed at about 90° relative two others in the sequence one-two-four-three around the periphery of the furnace, the first and fourth passes constituting substantial portions of the opposite first and second walls of the furnace enclosure lower portion, the second and third passes occupying substantial portions of the side walls of the furnace enclosure lower portion, in every extent of the furnace periphery the tubes of the one pass being interspersed with those of another;

headers between the four passes providing mixing points limiting the fluid enthalpy pick-up in each pass to a predetermined amount;

external downcomers between the passes;

at least one additional pass in the upper portion of the furnace comprising a plurality of parallel upflow tubes, the pass covering a substantial area of the periphery of the furnace upper portion, the remaining area constituting an exit for hot gases from the furnace;

the total heating surface of said flow passes achieving a predetermined enthalpy pick-up, each of the passes occupying a sufficient part of the furnace enclosure periphery so that the difference in temperature between adjacent tubes in the all-welded enclosure does not exceed approximately 100° F.

7. A forced flow once-through vapor generator comprising pass means including a large number of flow tubes defining a furnace enclosure which comprises first and second walls and side walls therebetween, the tubes being welded together so that the enclosure is essentially gas tight;

the furnace enclosure comprising upper and lower portions;

burner means in the furnace lower portion in at least one of said first and second walls;

the furnace lower portion comprising at least three flow passes in series including a first pass, a last pass and intermediate pass means including at least one intermediate pass;

one of said first and last passes constituting a substantial portion of the wall opposite said burner means;

the other of said first and last passes constituting a substantial portion of the wall which includes said burner means;

the intermediate pass means occupying a substantial portion of the side walls to provide a means for transition from the expansion and contraction of the first pass relative that of the last pass;

mixing points between the successive flow passes;

each of the passes occupying a sufficient part of the furnace enclosure periphery to achieve that enthalpy pick-up by which the difference in temperature between adjacent tubes in the all-welded enclosure does not exceed approximately 100° F.

8. In a forced-flow vapor generator according to claim 7 including a fifth pass in series with the fourth pass comprising a plurality of parallel upflow screen tubes occupying said remaining portion of the furnace periphery, an external downcomer connecting the upper header of the fourth pass to the lower header of the fifth pass.

9. A forced flow one-through vapor generator comprising pass means including a plurality of parallel vertical tubes defining a furnace enclosure having opposite first and second walls and side walls therebetween, the tubes being welded together so that the enclosure is essentially gas tight;

the furnace enclosure comprising upper and lower portions;
burner means in the furnace lower portion in at least one of said first and secoind walls;
the furnace enclosure lower portion comprising at least three flow passes including a first pass, a last pass, intermediate pass means including at least one intermediate pass, downcomers between the passes so that the flow is upwardly in each of the passes;
the furnace enclosure upper portion comprising at least one additional pass including a riser so that the additional pass is in series flow with the lower portion last pass;
one of said first and last passes constituting a substantial portion of the wall in said enclosure lower portion opposite said burner means;
the other of said first and last passes constituting a substantial portion of the wall which includes said burner means;
the intermediate pass means occupying a substantial portion of the side walls of the enclosure lower portion to provide a means for transition from the expansion and contraction of the first pass relative that of the last pass;
mixing points between the successive flow passes;
each of the passes occupying a sufficient part of the furnace enclosure periphery to achieve that enthalpy pick-up by which the difference in temperature between adjacent tubes in the all-welded enclosure does not exceed 100° F;
the total heating surface in said furnace enclosure lower portion achieving a predetermined enthalpy pick-up which with the enthalpy pick-up in the furnace upper portion reduces the furnace gas temperature to a predetermined amount.

10. A forced-flow once-through vapor generator comprising
pass means including a plurality of parallel vertical tubes defining a rectangular furnace enclosure having opposite first and second walls and side walls between the first and second walls, the tubes being welded together so that the enclosure is essentially gas tight;
the furnace enclosure comprising upper and lower portions;
burner means in the furnace lower portion in said opposite first and second walls;
the furnace enclosure lower portion comprising at least three flow passes in series including a first pass, a last pass, intermediate pass means including at least one intermediate pass, downcomer means so that the flow is upwardly in each of the passes;
the first and last passes occupying substantial portions of the first and second walls, the intermediate pass occupying substantial portions of the side walls to provide a means for transition from the expansion and contraction of the first pass relative that of the last pass;
mixing points between the successive flow passes;
each of the passes occupying a sufficient part of the furnace enclosure periphery to achieve that enthalpy pick-up by which the difference in temperature between adjacent tubes in the all-welded enclosure does not exceed 100° F.;
the furnace enclosure upper portion comprising at least one additional pass, riser means between said lower portion last pass and said one additional pass so that the upper portion additional pass is in flow series with said lower portion last pass.

11. A vapor generator according to claim 10 wherein the sizing and number of tubes in the furnace enclosure lower portion passes is such that the mass-flow rate increases from the first to the last lower portion pass.

12. The vapor generator according to claim 11 wherein the tubes of the upper portion additional pass have a lower fluid flow velocity than tubes of the lower portion passes whereby a minimum fluid pressure drop in the generator pass means is achieved.

13. In a forced-flow vapor generator according to claim 11 including a further pass in series with the additional pass comprising a plurality of pendant parallel upflow screen tubes occupying the fourth wall of the furnace enclosure upper portion and in addition upflow tubes defining a convection passageway in communication with the generator furnace, the screen tubes being between the furnace and convection passageway, but spaced apart to allow the flow of gases, and an external downncomer connecting the additional pass to the further pass.

14. The forced-flow once-through vapor generator according to claim 10 further including
an economizer section for said furnace tubes;
and at least one panel of additional tubes between and in series with said economizer section and lower portion first pass to achieve a predetermined enthalpy pick-up upstream of the lower portion first pass.

15. The forced-flow once-through vapor generator of claim 14 wherein said panel of additional tubes is a furnace division wall.

16. The forced-flow once-through vapor generator of claim 10 wherein said generator is top supported, the upper portion additional pass being welded to and supporting the enclosure lower portion passes.

References Cited

UNITED STATES PATENTS 3,125,995 3/1964 Koch .............. 122—406

KENNETH W. SPRAGUE, *Primary Examiner.*